Feb. 22, 1949.　　　　J. W. MOMBERG　　　　2,462,761
INDUCTOR ALTERNATOR
Filed Feb. 12, 1946　　　　　　　　　　　　2 Sheets-Sheet 1

Inventor
James W. Momberg
By William P. Stewart
Attorney

Witness:
N. Leozcak

UNITED STATES PATENT OFFICE 2,462,761

INDUCTOR ALTERNATOR

James W. Momberg, Somerville, N. J., assignor to The Singer Manufacturing Company, Elizabeth, N. J., a corporation of New Jersey Application February 12, 1946, Serial No. 646,972

11 Claims. (Cl. 171—252)

This invention relates to dynamo electric machines and more particularly to a tachometric type permanent-magnet inductor alternator that may be installed inside the housing of an ordinary electric motor.

A United States patent application, Serial No. 636,705, filed December 22, 1945, by James W. Momberg and Harry B. Fuge, describes and claims a system for plugging-braking an electric motor, in which an electric tachometric device controls the removal of power from the driving motor in order to terminate the braking period at an optimum time. The electric tachometric device, employed in this system, may be a permanent magnet induction alternator which has its rotor mechanically connected with the rotor of the motor to which the plugging-braking is to be applied. The instant application has for one of its objects the provision of a new and improved inductor alternator which is particularly adapted, but not necessarily restricted, to use in the system of braking set forth in United States patent application No. 636,705, supra.

Another object of the present invention is to provide a new and improved inductor alternator of such small size that it can be installed inside the housing of a fractional horse-power motor.

Still another object of the invention is to provide a new and improved inductor alternator.

Other important objects of the invention will be apparent from the following specification and appended claims.

For a complete understanding of the invention reference should be made to the accompanying drawings in which—

Figure 1:
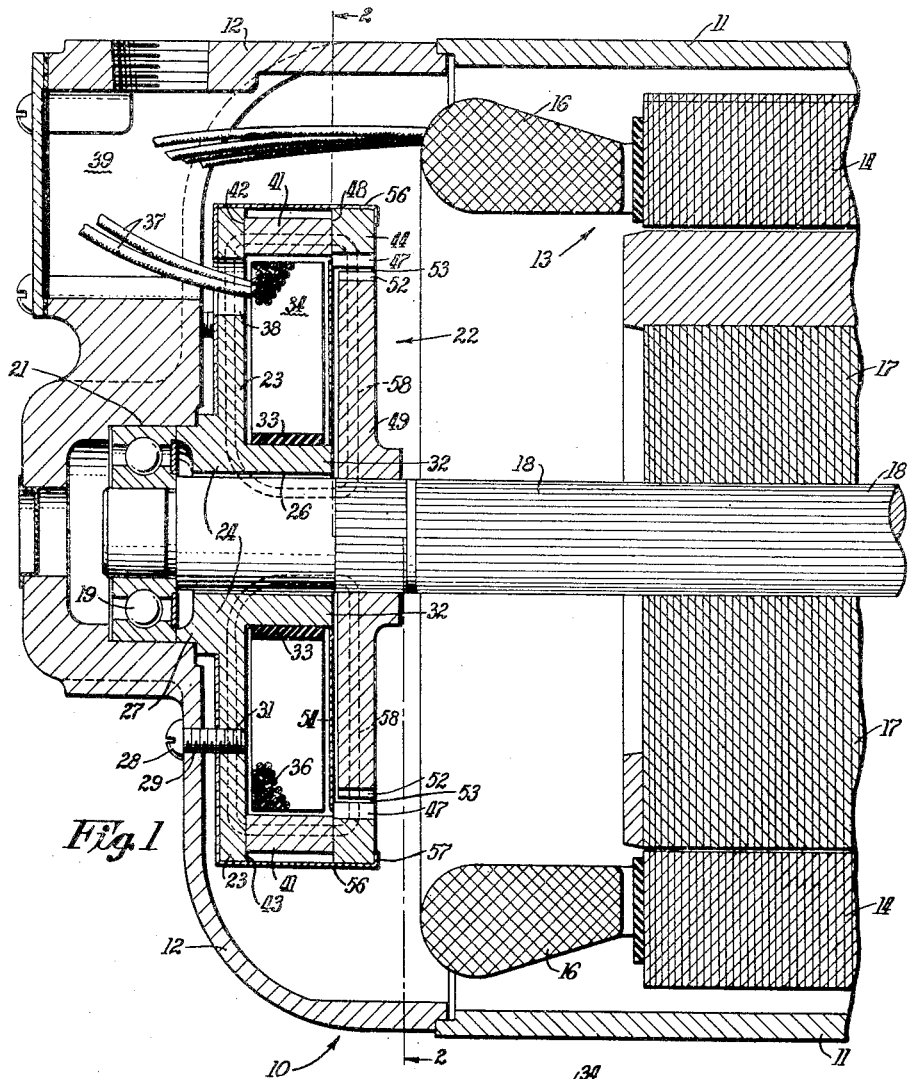
Fig. 1 is a longitudinal cross-sectional view of a permanent-magnet type inductor alternator and a standard driving motor.
Figure 2:
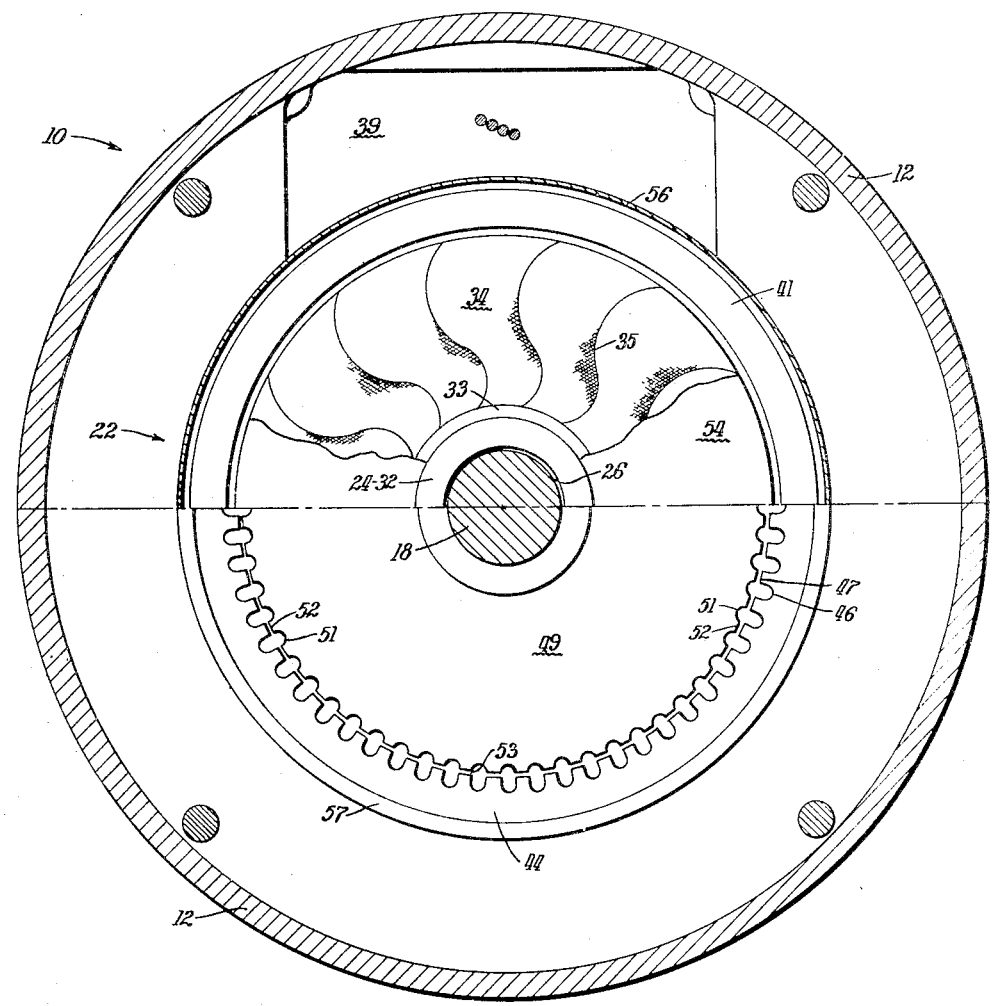
Fig. 2 is a cross-sectional view taken along the broken line 2—2 of Fig. 1 as viewed in the direction of the arrows, and having an insulating shield broken away to show a coil.

A preferred embodiment of the invention is illustrated in Figs. 1 and 2 of the drawings, wherein the numeral 10 indicates the housing of a standard driving motor which has a frame 11 and a pair of end bonnets 12, only one of the latter being shown. A stator 13, having laminations 14 and stator coils 16, is secured to the frame in any known manner. A rotor 17, that is positioned within the stator 13, is secured to a shaft 18 which is rotatably supported by a pair of anti-friction or ball bearings 19, only one of which is shown in the drawings. The outer race rings of the said bearings are supported in bearing recesses 21 which are provided in each of the end bonnets 12.

An inductor alternator 22, which is enclosed within the motor housing 10, has a cast-iron magnetizable disc frame 23 with a concentrically apertured hub 24 that concentrically surrounds the motor shaft 18 but is separated therefrom by an air gap 26. An outfacing portion 27 of the hub 24 engages the ball bearing recess 21 in the end bonnet 12, and the frame 23 of the alternator 22 is held in position by a plurality of screws 28 which pass through appropriate holes 29 in the end bonnet 12 and enter threaded holes 31 in the disc 23. An infacing portion 32 of the hub 24 carries, on its periphery, an insulating collar 33 and an annular stationary armature coil 34, the latter being composed of a multiplicity of turns of wire 36 covered with tape 35. The coil 34 is provided with a pair of leads 37 which pass through a hole 38 in the frame 23 and enter a terminal box 39 formed as a part of the end bonnet 12. The coil 34 is concentrically surrounded by a cylindrical or doughnut shaped permanent magnet 41, one end 42 of which abuts a face 43 of the frame 23. A magnetizable stator ring 44, preferably having sixty slots 46 and an equal number of interposed internally faced teeth 47 concentrically abuts the other end 48 of the magnet 41. A magnetizable rotor 49 preferably having sixty slots 51 and an equal number of interposed radially positioned teeth 52 is fixed to the rotor shaft 18 in such an axial position that it will rotate within the stator ring 44, there being provided a small air gap 53 between the teeth 47 and the teeth 52. An insulating washer 54 is positioned between the coil 34 and the rotor 49 and is held in place by the teeth 47 of the ring 44. The stationary parts of the alternator are covered by a can shaped non-magnetic shell 56, the outer edge of the shell being spun over the ring 44 as at 57.

The magnet 41, which may be made from an alloy similar to "Alnico V," is magnetized axially from end to end and thus magnetic flux, indicated by the dotted lines 58, flows through the magnet in an axial direction and provides the source of magnetism for the alternator. The path of the flux may be traced through the alternator from the left end 42 of the magnet 41 (Fig. 1), radially through the frame 23 through the infacing hub 32 across the air gap 26, axially along the shaft 18, radially through the rotor 49, the teeth 52, across the air gap 53, through the teeth 47 and through the stator ring 44, into the right face 48 (Fig. 1) of the magnet 41.

When the motor rotor 17 and shaft 18 are rotating the rotor 49 also rotates and causes the teeth 52 of the rotor 49 and the teeth 47 of the stator 44 to be alternately in and out of register. This alternately changes the reluctance of the magnetic path hereinbefore described and thereby pulses the magnetic flux 58 which links the coil 34. This pulsating magnetic flux produces an alternating voltage between the terminals of the leads 37 of the armature coil 34. When the motor is operating at full speed, the potential and frequency of the voltage produced at the terminals of the coil 34 will be high. When, as during a braking period, the speed of the rotor 17, the shaft 18 and the rotor 49 decreases, the voltage and frequency produced at the terminals of the coil 34 will also decrease until, when the rotors 17—49 and shaft 18 stop, no voltage whatsoever will be generated. As fully set forth in the United States patent application Serial No. 636,705, the terminal voltage of the coil 34 may be used to remove the reverse or plugging power from the motor and thus cause it to be braked or plugged electrically without any danger of reversing the direction of rotation thereof.

Figure 3:
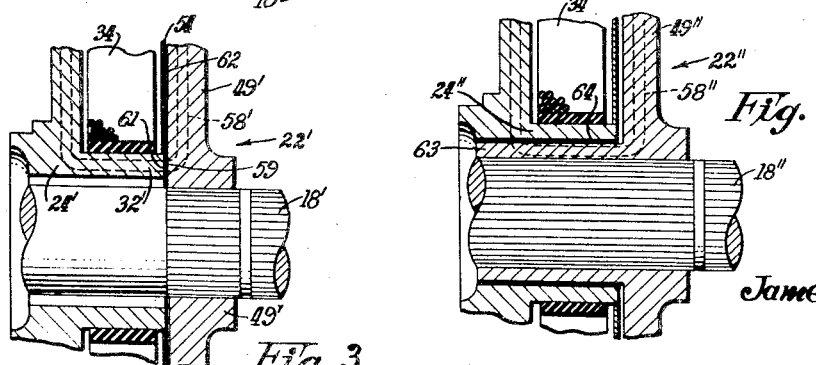
Fig. 3 shows a portion of a modified alternator.

Fig. 3 illustrates a modified form of alternator 22' that may be used when it is desirable to form the shaft 18' from a non-magnetic material, as for example, stainless steel. In this alternator the portion 32' of hub 24' is extended to form a very small air gap 59 between the right face 61 of the hub 24' and the left face 62 of the rotor 49'. In this case the magnetic flux, which is indicated by the dotted lines 58', passes directly from the hub 24' into the rotor 49' without passing through the shaft 18'.

Figure 4:
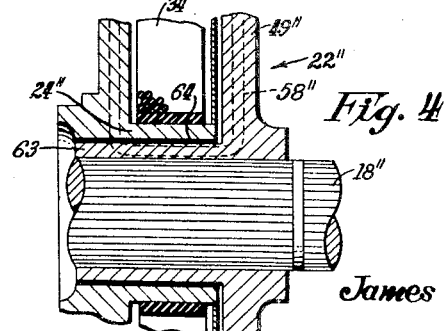
Fig. 4 shows another modification thereof.

Fig. 4 illustrates a further modification where the rotor 49" is provided with an integrally formed collar 63 that extends along the shaft 18" to a position below the coil 34. In this case the magnetic flux, which is indicated by the dotted lines 58" passes from the hub 24" across the air gap 64 into the collar 63 and thence into the rotor 49" without entering the shaft 18".

Having thus set forth the nature of the invention, what I claim herein is:

1. An inductor alternator comprising in combination a disc frame having a concentrically apertured hub, a coil supported on said hub, an axially magnetizable cylindrically shaped magnet surrounding said coil and having one end in contact with one face of said frame, a ring in contact with the other end of said magnet, a plurality of teeth formed on the inner circumference of said ring, a rotor mounted to rotate within said ring, and a plurality of teeth formed on the outer circumference of said rotor; the said frame, hub, toothed rotor, tooth ring and magnet forming a magnetic path linking said coil.

2. An inductor alternator comprising in combination a magnetizable disc frame having a concentrically apertured hub, a solenoid coil surrounding said hub, an axially magnetizable cylindrically shaped permanent magnet surrounding said coil and having one end in contact with one face of said frame, a magnetizable ring in contact with the other end of said magnet, a plurality of magnetizable teeth formed on the inner circumference of said ring, a magnetizable rotor mounted to rotate within said ring, and a plurality of magnetizable teeth formed on the outer circumference of said rotor; the said frame, hub, toothed rotor, tooth ring and magnet forming a magnetic path linking said coil.

3. In combination, a driving motor comprising a stator, a rotor and a housing; and an inductor alternator installed within the housing of said driving motor, the inductor alternator comprising a disc frame having a concentrically apertured hub, an armature coil concentrically supported on said hub, a cylindrically shaped permanent magnet surrounding said coil and having one end in contact with one face of said frame, a stator ring in contact with the other end of said magnet, a plurality of teeth formed on the inner circumference of said ring, a rotor mounted to rotate within said ring, and a plurality of teeth formed on the outer circumference of said rotor.

4. An inductor alternator comprising in combination a non-magnetic rotatably mounted shaft, a concentrically apertured hub surrounding but not contacting said shaft and thereby forming an air gap between said shaft and said hub, an armature coil concentrically carried on said hub, a cylindrically shaped magnet surrounding said coil and being magnetized axially from end to end, a rotor mounted on said shaft and arranged to rotate therewith, a stator ring formed concentrically with said magnet and positioned radially with respect to said rotor, a plurality of teeth on said stator ring, and a plurality of teeth on said rotor.

5. An inductor alternator comprising in combination a non-magnetic rotatably mounted shaft, a concentrically apertured hub spaced from said shaft, an armature coil concentrically carried on said hub, a cylindrically shaped permanent magnet surrounding said coil and being magnetized axially from end to end, a toothed rotor mounted on said shaft and being arranged to rotate therewith, said rotor also being arranged to rotate in closely spaced relationship with said hub, and a toothed stator ring formed concentrically with said magnet and positioned radially with respect to said rotor.

6. An inductor alternator comprising in combination a rotatably mounted shaft, a concentrically apertured hub surrounding but spaced from said shaft, an armature coil concentrically carried on said hub, a cylindrically shaped permanent magnet surrounding said coil and being magnetized axially from end to end, a toothed rotor and a collar formed integrally therewith mounted on said shaft, the collar being arranged to rotate within said apertured hub, and a toothed stator ring located concentrically with said magnet and positioned radially with respect to said rotor.

7. An inductor alternator comprising a disc frame having a concentrically apertured hub, an armature coil concentrically supported on said hub, a cylindrically shaped permanent magnet surrounding said coil and having one end in contact with one face of said frame, a stator ring in contact with the other end of said magnet, a plurality of teeth formed on the inner circumference of said ring, a rotor mounted to rotate within said ring, and a plurality of teeth formed on the outer circumference of said rotor, said teeth on said rotor being spaced a short air-gap distance from said teeth on said ring.

8. In combination, a driving motor comprising a stator, a rotor and a housing; and an inductor alternator installed within the housing of said driving motor, the inductor alternator comprising a frame having an apertured hub, an armature coil supported on said hub, an axially magnetized permanent magnet surrounding said coil and having one end in contact with said frame, a magnetizable stator member in contact with the other end of said magnet, a plurality of teeth formed on the inner surface of said stator member, a rotor mounted to rotate within said stator member, and a plurality of teeth formed on the outer surface of said rotor, said teeth on said rotor being spaced a short air-gap distance from said teeth on said stator member.

9. An inductor alternator comprising in combination a non-magnetic rotatably mounted shaft, an apertured hub surrounding but not contacting said shaft and thereby forming an air gap between said shaft and said hub, an armature coil carried on said hub, a magnet surrounding said coil and being magnetized axially from end to end, a rotor mounted on said shaft and arranged to rotate therewith, a magnetizable stator member associated with said magnet and positioned radially with respect to said rotor, a plurality of teeth on said stator member, and a plurality of teeth on said rotor, said teeth on said rotor being spaced a short air-gap distance from said teeth on said stator member.

10. An inductor alternator comprising in combination a non-magnetic rotatably mounted shaft, an apertured hub spaced from said shaft, an armature coil carried on said hub, a permanent magnet surrounding said coil and being magnetized axially from end to end, a toothed rotor mounted on said shaft and being arranged to rotate therewith, said rotor also being arranged to rotate in closely spaced relationship with said hub, and a toothed stator positioned radially with respect to said rotor, said toothed rotor being spaced a short-air-gap distance from said toothed stator.

11. An inductor alternator comprising in combination a rotatably mounted shaft, an apertured hub surrounding but spaced from said shaft, an armature coil carried on said hub, a permanent magnet surrounding said coil and being magnetized axially from end to end, a toothed rotor and a collar formed integrally therewith mounted on said shaft, the collar being arranged to rotate within said apertured hub, and a toothed stator positioned radially with respect to said rotor, said toothed rotor being spaced a short air-gap distance from said toothed stator.

JAMES W. MOMBERG.

REFERENCES CITED

The following references are of record in the file of this patent:

UNITED STATES PATENTS

| Number | Name | Date |
| --- | --- | --- |
| 567,423 | Thury | Sept. 8, 1896 |
| 827,331 | Tirrill | July 31, 1906 |

FOREIGN PATENTS

| Number | Country | Date |
| --- | --- | --- |
| 498,366 | Great Britain | Jan. 6, 1939 |